(12) United States Patent
Chuckta et al.

(10) Patent No.: US 10,378,573 B2
(45) Date of Patent: Aug. 13, 2019

(54) ANTI-ROTATION RETAINING PIN

(71) Applicant: UNITED TECHNOLOGIES CORPORATION, Farmington, CT (US)

(72) Inventors: Andrew Chuckta, Middletown, CT (US); Matthew D. Parekh, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 192 days.

(21) Appl. No.: 15/657,423

(22) Filed: Jul. 24, 2017

(65) Prior Publication Data

US 2019/0024694 A1 Jan. 24, 2019

(51) Int. Cl.
F16B 21/12 (2006.01)
F01D 17/16 (2006.01)

(52) U.S. Cl.
CPC .............. F16B 21/12 (2013.01); F01D 17/16 (2013.01)

(58) Field of Classification Search
CPC ........... F16B 21/12; F16B 39/24; F01D 17/16
USPC .......... 411/132, 133, 134, 143, 146
See application file for complete search history.

(56) References Cited

U.S. PATENT DOCUMENTS

| 256,149 | A | * | 4/1882 | Long et al. | F16B 39/24 411/81 |
| 470,520 | A | * | 3/1892 | Timmis | F16B 39/24 411/146 |
| 814,555 | A | * | 3/1906 | Mecherle | F16B 39/24 411/143 |
| 820,324 | A | * | 5/1906 | Taylor | F16B 39/08 411/197 |
| 974,352 | A | * | 11/1910 | Brister | F16B 39/24 411/149 |
| 1,470,294 | A | * | 10/1923 | Sell | F16B 39/10 411/120 |
| 1,498,686 | A | | 6/1924 | Farnsworth | |
| 1,938,529 | A | * | 12/1933 | Miller | F16B 39/10 411/197 |
| 2,034,266 | A | * | 3/1936 | Moore | F16B 21/12 238/253 |
| 4,286,921 | A | | 9/1981 | Donlan et al. | |
| 4,781,502 | A | | 11/1988 | Kushnick | |

(Continued)

FOREIGN PATENT DOCUMENTS

| EP | 1403467 | 3/2004 |
| EP | 1707756 | 10/2006 |
| EP | 2177771 | 4/2010 |

(Continued)

OTHER PUBLICATIONS

European Patent Office, European Search Report dated Feb. 18, 2019 in Application No. 18182868.2.

Primary Examiner — Roberta S Delisle
(74) Attorney, Agent, or Firm — Snell & Wilmer, L.L.P.

(57) ABSTRACT

A retaining pin having anti-rotation features is provided. The retaining pin may comprise a pin shaft coupled to a retaining flange. The pin shaft may be inserted into a structural member proximate a shaft and a nut. The retaining flange may comprise an anti-rotation void defined by a first arm and a second arm and configured to engage the shaft. In response to the nut coupling the retaining flange to the shaft, the retaining pin may at least partially reduce movement and rotation of the shaft relative to the retaining pin.

19 Claims, 6 Drawing Sheets

(56) References Cited

U.S. PATENT DOCUMENTS

H1981 H * 8/2001 Hennick ........................ 411/102
10,161,437 B2 * 12/2018 Geller ........................ A45F 3/14

FOREIGN PATENT DOCUMENTS

GB      2452232     3/2009
WO    2008045291    4/2008

* cited by examiner

ANTI-ROTATION RETAINING PIN

FIELD

The present disclosure relates to retaining pins, and more specifically, to a retaining pin with anti-rotation features for structural components.

BACKGROUND

Retaining pins typically comprise a pin shaft and a retaining tab. The pin shaft may pivotally couple the retaining pin to a structural component. The retaining tab may be configured to engage a nearby shaft to retain the shaft and limit movement and rotation in the shaft. Typically, the retaining tab comprises a machined recess to allow the retaining tab to be coupled to the shaft with a nut (e.g., the nut fits within the machined recess). Because the recess is machined into the retaining tab, typical retaining tabs have a greater thickness to account for the machined recess without making the material too thin, and have a greater associated part cost and time to create.

SUMMARY

In various embodiments, a retaining pin is disclosed. The retaining pin may comprise a retaining flange comprising a flange body having a top surface and a first end opposite a second end; an anti-rotation void defining a void through the flange body proximate the second end, wherein the anti-rotation void comprises an opening on an outer edge of the retaining flange; a first arm defining a first circumferential edge of the anti-rotation void proximate the second end; and a second arm defining a second circumferential edge of the anti-rotation void proximate the first end, wherein at least one of the first arm or the second arm comprises a finger extending in a first direction away from the top surface of the flange body proximate the opening.

In various embodiments, the retaining pin may further comprise a pin shaft coupled to the first end of the flange body. The pin shaft may be coupled to the first end of the flange body via welding, brazing, or an adhesive. The pin shaft may be coupled to the first end of the flange body using a press fit installation process. In response to the finger being located on the first arm, the finger may comprise a bent portion of the first arm. In response to the finger being located on the second arm, the finger may comprise a bent portion of the second arm. The finger may comprise a rectangular, oval, circular, or triangular shape.

In various embodiments, a structural component is disclosed. The structural component may comprise a first portion proximate a second portion; a shaft coupled to the second portion; and a retaining pin. The retaining pin may comprise: a pin shaft having a first shaft end opposite a second shaft end, wherein the second shaft end is pivotally coupled to the first portion of the structural component; a retaining flange comprising a flange body having a top surface and a first flange end opposite a second flange end, wherein the first flange end is coupled to the second shaft end of the pin shaft; an anti-rotation void defining a void through the flange body proximate the second flange end, wherein the anti-rotation void comprises an opening on an outer edge of the retaining flange; a first arm defining a first circumferential edge of the anti-rotation void proximate the second flange end, wherein the first arm comprises a first finger extending in a first direction away from the top surface of the flange body proximate the opening; and a second arm defining a second circumferential edge of the anti-rotation void proximate the first flange end, wherein the second arm comprises a second finger extending in the first direction away from the top surface of the flange body proximate the opening.

In various embodiments, the retaining pin may be configured to pivot about the pin shaft to cause the retaining flange to contact the shaft. In response to the retaining flange contacting the shaft, the anti-rotation void may be configured to engage the shaft causing the first arm and the second arm to at least partially contact the shaft. The structural component may further comprise a nut coupled to the shaft, wherein in response to the nut being tightened, the nut contacts the retaining flange to cause the retaining flange to contact the second portion of the structural component. The first finger and the second finger may be configured to at least partially contact the nut in response to the shaft being displaced. The pin shaft may be coupled to the retaining flange via welding, brazing, or an adhesive. The pin shaft may be coupled to the retaining flange using a press fit installation process. The first finger may comprise a bent portion of the first arm. The second finger may comprise a bent portion of the second arm. The first finger and the second finger may comprise a rectangular, oval, circular, or triangular shape.

In various embodiments, a method of installing a retaining pin is disclosed. The method may comprise inserting a pin shaft of the retaining pin into a pin void of a first portion of a structural component, wherein a second portion of the structural component comprises a shaft; pivoting the retaining pin about the pin shaft, wherein in response to pivoting the retaining pin, a retaining flange of the retaining pin contacts the shaft; and tightening a nut onto the shaft, wherein in response to tightening the nut onto the shaft, the nut contacts the retaining pin causing the retaining pin to retain the shaft and at least partially limit rotation of the shaft relative to the pin shaft.

In various embodiments, in response to the retaining pin contacting the shaft, an anti-rotation void defining a void through the retaining flange is configured to engage the shaft. In response to the anti-rotation void engaging the shaft, a first arm defining a first circumferential edge of the anti-rotation void and a second arm defining a second circumferential edge of the anti-rotation void contact the shaft to at least partially limit rotation of the shaft relative to the pin shaft.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. An X-Y-Z axis is shown throughout the figures to illustrate the relative position of various components.

Figure 1A:
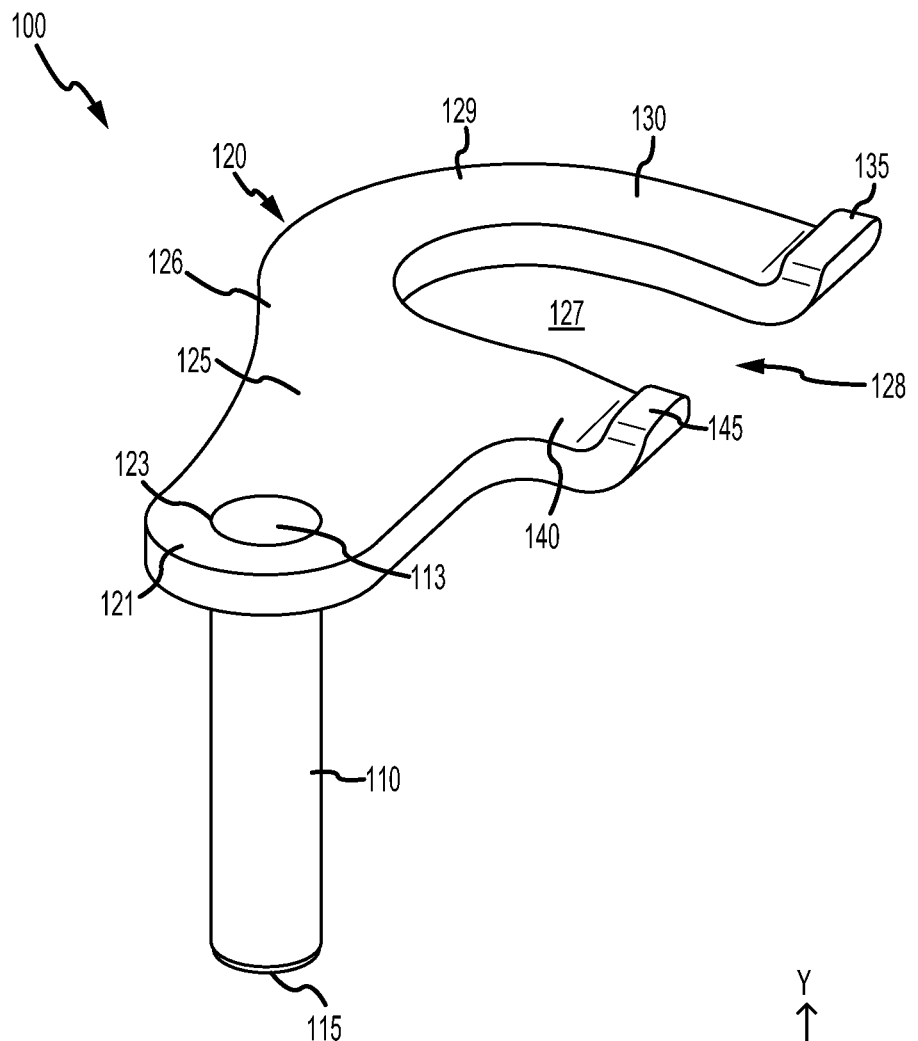
FIG. 1A illustrates a perspective view of a retaining pin, in accordance with various embodiments.
Figure 1B:
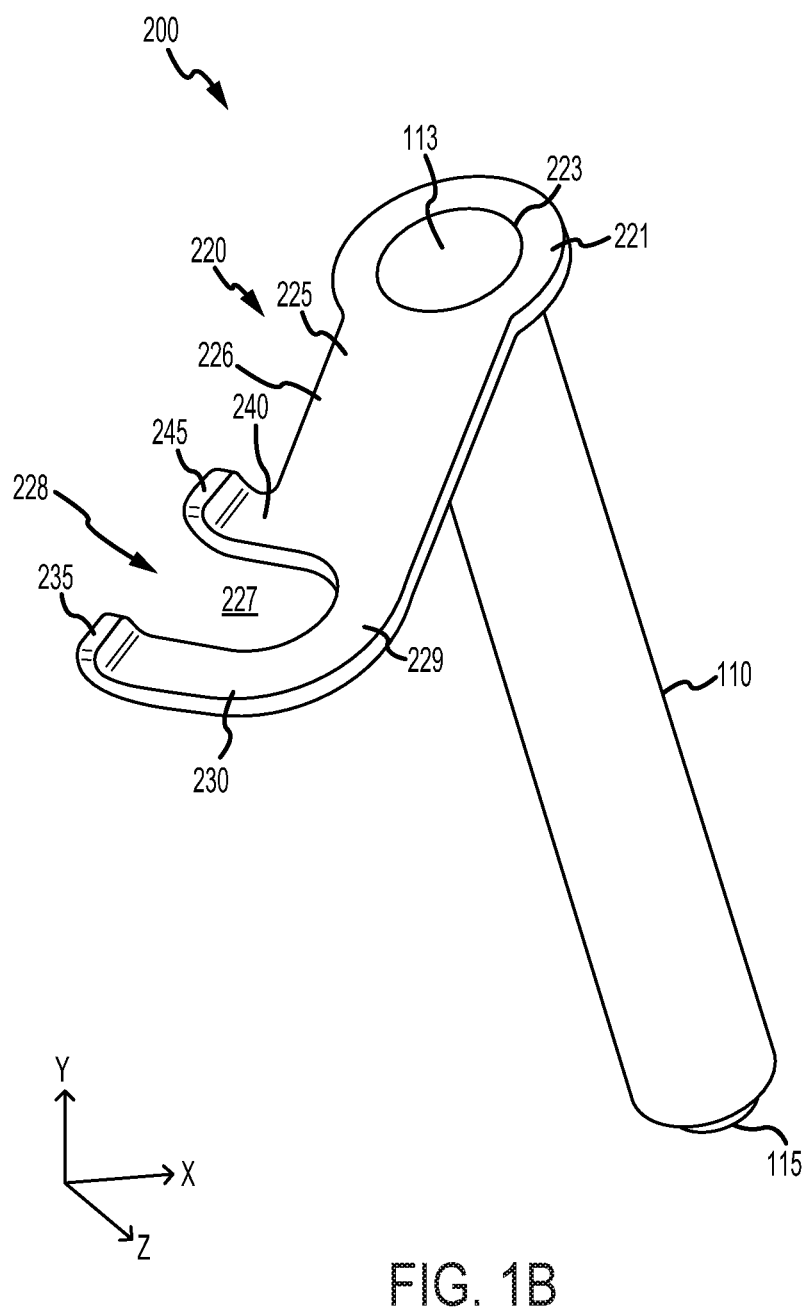
FIG. 1B illustrates a perspective view of a retaining pin having an elongated flange body, in accordance with various embodiments.

In various embodiments, and with reference to FIGS. 1A and 1B, a retaining pin 100 is disclosed. Retaining pin 100 may be configured to couple to a structural member and engage a proximate shaft and nut. In response to retaining pin 100 engaging the shaft and the nut being coupled to retaining pin 100 and the shaft, retaining pin 100 may provide anti-rotation features to the shaft, as discussed further herein. Retaining pin 100 may reduce cost and weight compared to typical retaining pins by providing anti-rotation features without the use of a machined recess.

In various embodiments, retaining pin 100 may comprise a pin shaft 110 and a retaining flange 120. Pin shaft 110 and/or retaining flange 120 may be formed using any suitable process. For example, pin shaft 110 and/or retaining flange 120 may be formed individually by machining, investment casting, and/or the like. In various embodiments, pin shaft 110 and/or retaining flange 120 may also be formed by an additive manufacturing process, such as, for example, fused deposition modeling, polyjet 3D printing, electron-beam freeform fabrication, direct metal laser sintering, electron-beam melting, selective laser melting, selective laser sintering, multiphoton polymerization, digital light processing, and/or any other suitable additive manufacturing process. Additive manufacturing techniques may enable the formation of complex contours and/or voids in retaining flange 120, such as, for example, void 123, anti-rotation void 127, and/or first finger 135 and second finger 145. Pin shaft 110 and retaining flange 120 may comprise any suitable material, such as, for example, an aluminum, a bronze alloy (e.g., aluminum nickel bronze), a nickel alloy, titanium, a nickel chromium alloy, and/or any other suitable material.

In various embodiments, pin shaft 110 may be configured to couple retaining pin 100 to a structural component (e.g., structural component 270, with brief reference to FIG. 2A), hinge, joint, and/or the like. In that respect, pin shaft 110 may pivotally couple retaining pin 100 to the structural component, hinge, joint, and/or the like, proximate a shaft (e.g., shaft 280, with brief reference to FIG. 2A) to retain the shaft and at least partially limit rotation in the shaft. Pin shaft 110 may comprise a first end 113 opposite a second end 115 along the Y-axis. Second end 115 may be configured to couple pin shaft 110 to the structural member, hinge, joint, and/or the like, as discussed further herein. First end 113 may be configured to couple pin shaft 110 to retaining flange 120, as discussed further herein.

In various embodiments, retaining flange 120 may be configured to interface with a shaft to retain the shaft and at least partially limit rotation in the shaft, as discussed further herein. Retaining flange 120 may comprise a flange body 125. Flange body 125 may comprise any suitable or desired shape and size. For example, the shape and/or size of flange body 125 may be based on operational needs, such as a distance from the coupling point of pin shaft 110 to the structural component to the shaft, as discussed further herein. For example, with specific reference to FIG. 1A and in accordance with various embodiments, flange body 125 may comprise a wide width and a shortened length (relative to flange body 125 depicted in FIG. 1A). As a further example, with specific reference to FIG. 1B and in accordance with various embodiments, a retaining pin 200 may comprise a retaining flange 220 having an elongated flange body 225. Retaining flange 220 may be similar to retaining flange 120, with brief reference to FIG. 1A. Elongated flange body 225 may comprise a narrow width and an elongated length (relative to flange body 125 depicted in FIG. 1A). For example, elongated flange body 225 may comprise a length (defined as a distance between a void 223 and an anti-rotation void 227) that is at least twice the distance as a width of the elongated flange body 225.

In various embodiments, and with reference again to FIG. 1A, flange body 125 may comprise a coupling end 121 (e.g., a first end) opposite an anti-rotation end 129 (e.g., a second end) along the X-axis. Coupling end 121 may comprise a void 123. Void 123 may define a void through the surface of coupling end 121. Void 123 may be configured to receive first end 113 of pin shaft 110, to allow first end 113 of pin shaft 110 to couple to retaining flange 120. For example, pin shaft 110 may couple to retaining flange 120 using any suitable method, such as, for example, via welding, brazing, an adhesive, and/or the like. In various embodiments, pin shaft 110 may also be press fit with retaining flange 120.

With brief reference to FIG. 1B, elongated flange body 225 may comprise a coupling end 221 opposite an anti-rotation end 229. Coupling end 221 may comprise a void 223 defining a void through coupling end 221. Void 223 may be similar to void 123.

In various embodiments, retaining flange 120 may comprise a first arm 130 and a second arm 140. First arm 130 may comprise a portion of flange body 125 proximate anti-rotation end 129 that is configured to engage a shaft (e.g., shaft 280, with brief reference to FIG. 2A) to retain the shaft and at least partially limit rotation of the shaft relative to retaining pin 100, as discussed further herein. Second arm 140 may comprise a portion of flange body 125 proximate coupling end 121 that is configured to engage the shaft (e.g., shaft 280, with brief reference to FIG. 2A) to retain the shaft and at least partially limit rotation of the shaft (e.g., shaft 280, with brief reference to FIG. 2A) relative to retaining pin 100, as discussed further herein. With brief reference to FIG. 1B, retaining flange 220 may comprise a first arm 230 and a second arm 240. First arm 230 may be similar to first arm 130, and second arm 240 may be similar to second arm 140.

In various embodiments, retaining flange 120 may comprise an anti-rotation void 127. Anti-rotation void 127 may define a void through the surface of flange body 125 proximate anti-rotation end 129. In that respect, first arm 130 may define a first circumferential edge of anti-rotation void 127 proximate anti-rotation end 129, and second arm 140 may define a second circumferential edge of anti-rotation void 127 proximate coupling end 121. Anti-rotation void 127 may comprise an opening 128 located between first arm 130 and second arm 140. Opening 128 may be configured to allow anti-rotation void 127 to receive and interface with a shaft (e.g., shaft 280, as depicted in FIG. 2B). In that regard, anti-rotation void 127 and opening 128 may comprise any suitable shape or size capable of receiving and interfacing with the shaft. With brief reference to FIG. 1B, retaining flange 220 may comprise an anti-rotation void 227 defining a void through elongated flange body 225, and may comprise an opening 228. Anti-rotation void 227 may be similar to anti-rotation void 127.

In various embodiments, first arm 130 may comprise a first finger 135. First finger 135 may be located on a portion of first arm 130 proximate opening 128 of anti-rotation void 127. First finger 135 may be configured to aid in retaining and/or at least partially limiting rotation of a shaft relative to retaining pin 100, as discussed further herein. First finger 135 may define a portion of first arm 130 proximate opening 128 that extends along the Y-axis in a direction away from a top surface 126 of retaining flange 120. In that respect, first finger 135 may be formed using any suitable technique. For example, a portion of first arm 130 may be bent along the Y-axis to form first finger 135. First finger 135 may comprise any suitable shape and/or size capable of retaining and/or at least partially limiting rotation of a shaft. For example, first finger 135 may be square shaped, or may comprise a rectangular, oval, circular, triangular, and/or the like shape. With brief reference to FIG. 1B, first arm 230 may comprise a first finger 235. First finger 235 may be similar to first finger 135.

In various embodiments, second arm 140 may comprise a second finger 145. Second finger 145 may be located on a portion of second arm 140 proximate opening 128 of anti-rotation void 127. Second finger 145 may be configured to aid in retaining and/or at least partially limiting rotation of a shaft relative to retaining pin 100, as discussed further herein. Second finger 145 may define a portion of second arm 140 proximate opening 128 that extends along the Y-axis in a direction away from top surface 126 of retaining flange 120. In that respect, second finger 145 may be formed using any suitable technique. For example, a portion of second arm 140 may be bent along the Y-axis to form second finger 145. In that respect, second finger 145 may comprise any suitable shape and/or size capable of retaining and/or at least partially limiting rotation of a shaft. For example, second finger 145 may be square shaped, or may comprise a rectangular, oval, circular, triangular, and/or the like shape. With brief reference to FIG. 1B, second arm 240 may comprise a second finger 245. Second finger 245 may be similar to second finger 145.

Figure 2A:
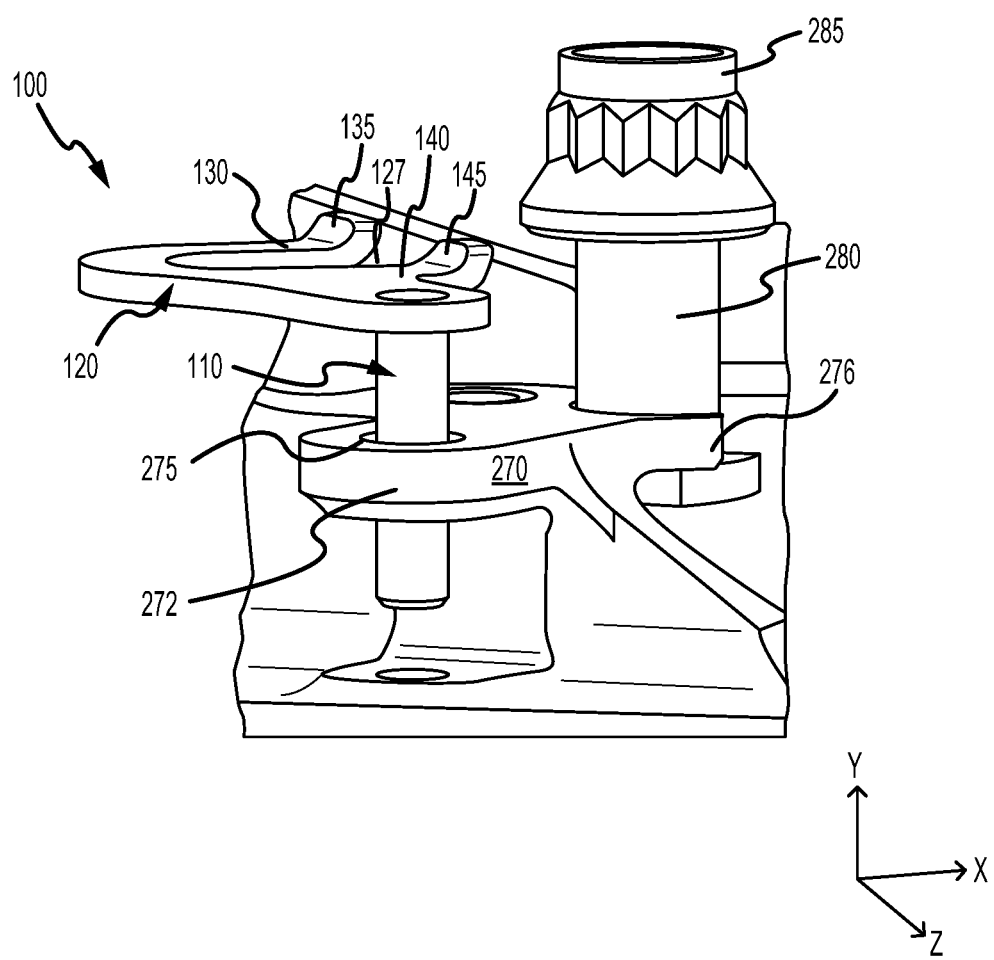
FIG. 2A illustrates a perspective view of a retaining pin disengaged from a shaft, in accordance with various embodiments.
Figure 2B:
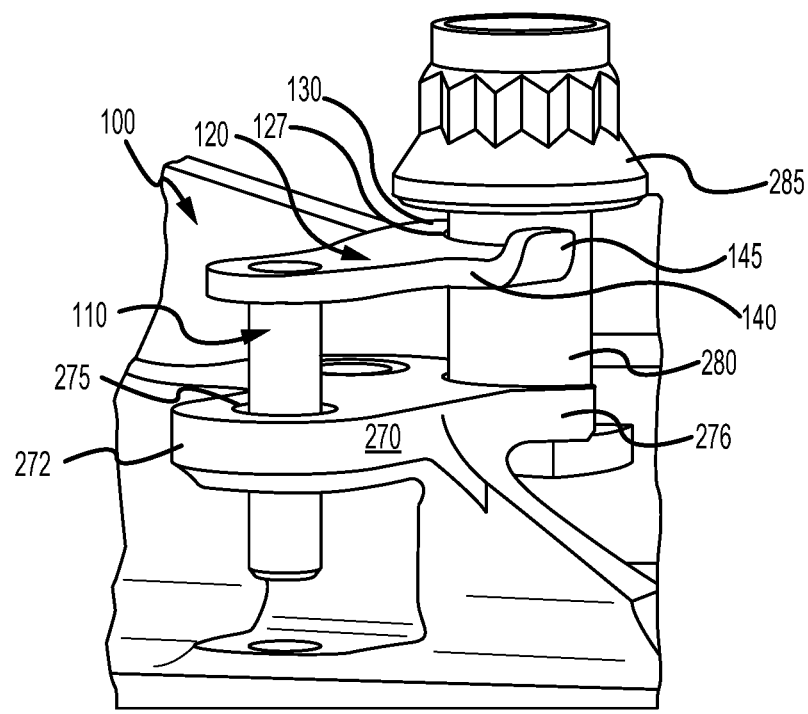
FIG. 2B illustrates a perspective view of a retaining pin engaged with a shaft, in accordance with various embodiments.
Figure 2C:
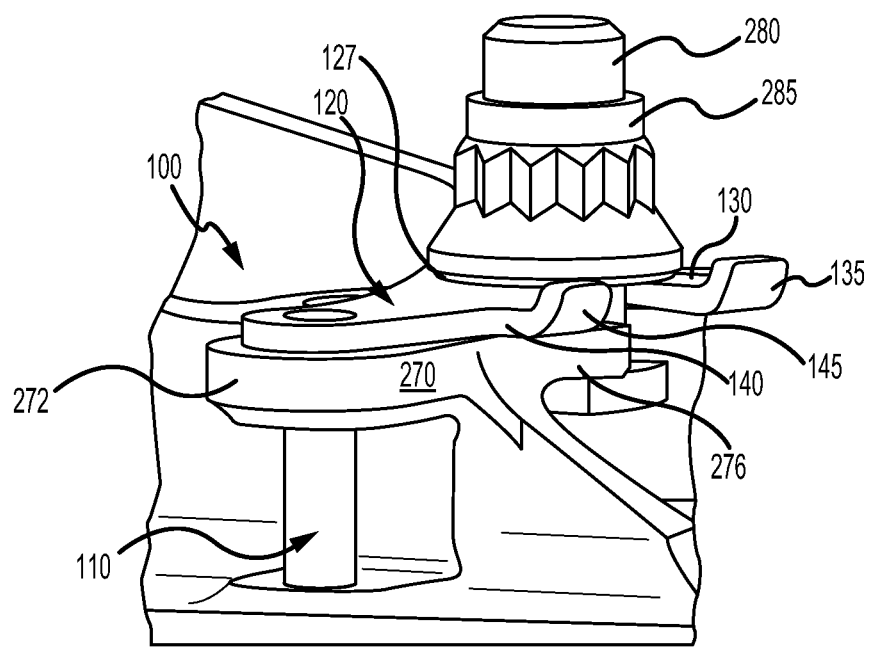
FIG. 2C illustrates a perspective view of a retaining pin engaged with a shaft and a nut, in accordance with various embodiments.
Figure 3:
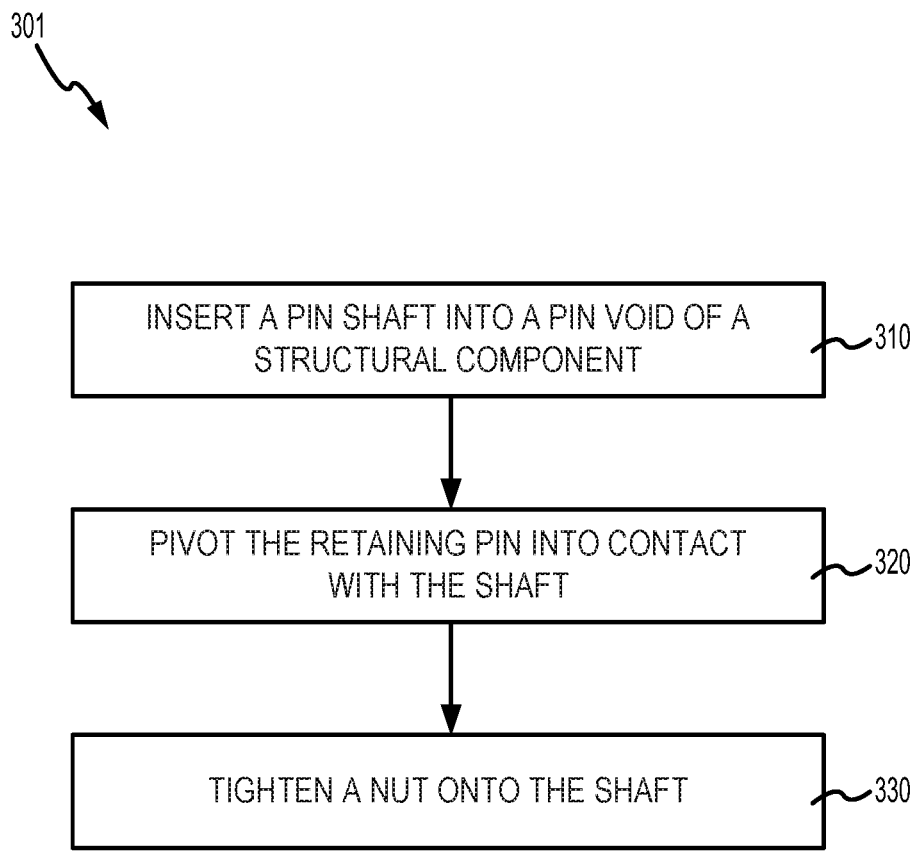
FIG. 3 illustrates a process flow for a method of installing a retaining pin on to a structural component, in accordance with various embodiments.

In various embodiments, and with reference to FIGS. 2A-2C, retaining pin 100 is depicted interacting with and engaging a structural component 270. Structural component 270 may comprise any suitable or desired structural component 270 having a shaft 280. Shaft 280 may comprise a screw, bolt, and/or the like, and may be configured to couple structural component 270 to a second structural component, a hinge joint, and/or the like. Structural component 270 may comprise a first portion 272 and a second portion 276. First portion 272 may comprise a pin void 275 defining a void through the surface of first portion 272. Pin void 275 may be configured to receive pin shaft 110 to allow retaining pin 100 to pivotally couple to structural component 270. Second portion 276 may be configured to couple to shaft 280. In various embodiments, shaft 280 may be secured with a nut 285. In that respect, shaft 280 may comprising threading and/or the like to allow nut 285 to couple to and secure shaft 280.

In various embodiments, and with specific reference to FIG. 2A, retaining pin 100 is depicted coupled to structural component 270 and disengaged from shaft 280. In a disengaged position, retaining pin 100 may be inserted through pin void 275 to pivotally couple retaining pin 100 to structural component 270. In the disengaged position, retaining pin 100 may not be in contact with shaft 280 and nut 285 may be decoupled to shaft 280 or may not be fully coupled and secured to shaft 280 (as depicted in FIG. 2A).

In various embodiments, and with specific reference to FIG. 2B, retaining pin 100 is depicted coupled to structural component 270 and engaged with shaft 280. In an engaged position, retaining pin 100 may be pivotally coupled to structural component 270, via pin void 275, and retaining flange 120 may be engaged with shaft 280. For example, retaining pin 100 may pivot about pin shaft 110 such that retaining flange 120 contacts shaft 280 (e.g., shaft 280 inserts into anti-rotation void 127). In that respect, first arm 130 and second arm 140 may be in contact with shaft 280.

In various embodiments, and with specific reference to FIG. 2C, retaining pin 100 is depicted coupled to structural component 270 and engaged with shaft 280 and nut 285. In the engaged position, retaining pin 100 may be pivotally coupled to structural component 270, via pin void 275, and retaining flange 120, via anti-rotation void 127, may be engaged with shaft 280. Nut 285 may be tightened on to shaft 280 to engage retaining flange 120 (e.g., to fix retaining flange 120 against shaft 280 and second portion 276 of structural component 270). In that respect, in the engaged position movement and rotation by shaft 280 along the X-axis or Z-axis may be at least partially limited by retaining pin 100. For example, in response to movement or rotation of shaft 280, nut 285 may contact the inner surfaces of first arm 130 and/or second arm 140, thus at least partially limiting further rotation or movement of shaft 280. Moreover, in response to movement or rotation of shaft 280, shaft 280 may contact an inner circumference of anti-rotation void 127, thus at least partially limiting further rotation or movement of shaft 280.

In various embodiments, and with reference to FIG. 3 and FIGS. 2A-2C, a method 301 of installing a retaining pin on to a structural member is disclosed. Method 301 may comprise inserting pin shaft 110 into pin void 275 of structural component 270 (Step 310). Method 301 may comprise pivoting retaining pin 100 into contact with shaft 280 (Step 320). For example, an inner circumference of anti-rotation void 127 may contact shaft 280 such that first arm 130 and second arm 140 at least partially contact shaft 280. Method 301 may comprise tightening nut 285 on to shaft 280 (Step 330). In that respect, nut 285 may be coupled to shaft 280, and may be tightened to contact retaining flange 120. For example, nut 285 may be tightened on to shaft 280 such that nut retaining flange 120 contacts second portion 276 of structural component 270 (e.g., as depicted in FIG. 2C).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retaining pin, comprising:
    a retaining flange comprising a flange body having a top surface and a first end opposite a second end and a pin shaft coupled to the first end of the flange body;
    an anti-rotation void defining a void through the flange body proximate the second end, wherein the anti-rotation void comprises an opening on an outer edge of the retaining flange;
    a first arm defining a first circumferential edge of the anti-rotation void proximate the second end; and
    a second arm defining a second circumferential edge of the anti-rotation void proximate the first end, wherein at least one of the first arm or the second arm comprises a finger extending in a first direction away from the top surface of the flange body proximate the opening.

2. The retaining pin of claim 1, wherein the pin shaft is coupled to the first end of the flange body via welding, brazing, or an adhesive.

3. The retaining pin of claim 1, wherein the pin shaft is coupled to the first end of the flange body using a press fit installation process.

4. The retaining pin of claim 1, wherein in response to the finger being on the first arm, the finger comprises a bent portion of the first arm.

5. The retaining pin of claim 1, wherein in response to the finger being on the second arm, the finger comprises a bent portion of the second arm.

6. The retaining pin of claim 1, wherein the finger comprises a rectangular, oval, circular, or triangular shape.

7. A structural component, comprising:
    a first portion proximate a second portion;
    a shaft coupled to the second portion; and
    a retaining pin, comprising:
        a pin shaft having a first shaft end opposite a second shaft end, wherein the second shaft end is pivotally coupled to the first portion of the structural component;
        a retaining flange comprising a flange body having a top surface and a first flange end opposite a second flange end, wherein the first flange end is coupled to the second shaft end of the pin shaft;
        an anti-rotation void defining a void through the flange body proximate the second flange end, wherein the anti-rotation void comprises an opening on an outer edge of the retaining flange;
        a first arm defining a first circumferential edge of the anti-rotation void proximate the second flange end, wherein the first arm comprises a first finger extending in a first direction away from the top surface of the flange body proximate the opening; and
        a second arm defining a second circumferential edge of the anti-rotation void proximate the first flange end, wherein the second arm comprises a second finger extending in the first direction away from the top surface of the flange body proximate the opening.

8. The structural component of claim 7, wherein the retaining pin is configured to pivot about the pin shaft to cause the retaining flange to contact the shaft.

9. The structural component of claim 8, wherein in response to the retaining flange contacting the shaft, the anti-rotation void is configured to engage the shaft causing the first arm and the second arm to at least partially contact the shaft.

10. The structural component of claim 9, further comprising a nut coupled to the shaft, wherein in response to the nut being tightened, the nut contacts the retaining flange to cause the retaining flange to contact the second portion of the structural component.

11. The structural component of claim 10, wherein the first finger and the second finger are configured to at least partially contact the nut in response to the shaft being displaced.

12. The structural component of claim 7, wherein the pin shaft is coupled to the retaining flange via welding, brazing, or an adhesive.

13. The structural component of claim 7, wherein the pin shaft is coupled to the retaining flange using a press fit installation process.

14. The structural component of claim 7, wherein the first finger comprises a bent portion of the first arm.

15. The structural component of claim 7, wherein the second finger comprises a bent portion of the second arm.

16. The structural component of claim 7, wherein the first finger and the second finger comprise a rectangular, oval, circular, or triangular shape.

17. A method of installing a retaining pin, comprising:
inserting a pin shaft of the retaining pin into a pin void of a first portion of a structural component, wherein a second portion of the structural component comprises a shaft;
pivoting the retaining pin about the pin shaft, wherein in response to pivoting the retaining pin, a retaining flange of the retaining pin contacts the shaft; and
tightening a nut onto the shaft, wherein in response to tightening the nut onto the shaft, the nut contacts the retaining pin causing the retaining pin to retain the shaft and at least partially limit rotation of the shaft relative to the pin shaft.

18. The method of claim 17, wherein in response to the retaining pin contacting the shaft, an anti-rotation void defining a void through the retaining flange is configured to engage the shaft.

19. The method of claim 18, wherein in response to the anti-rotation void engaging the shaft, a first arm defining a first circumferential edge of the anti-rotation void and a second arm defining a second circumferential edge of the anti-rotation void contact the shaft to at least partially limit rotation of the shaft relative to the pin shaft.

* * * * *